US012115802B2

(12) United States Patent
Rhoades et al.

(10) Patent No.: US 12,115,802 B2
(45) Date of Patent: Oct. 15, 2024

(54) PRINTING ON FREE SURFACES

(71) Applicant: Micropply Limited, Altrincham (GB)

(72) Inventors: Anthony David George Rhoades, Hale (GB); Samuel Paul Cornish-Evans, Knutsford (GB)

(73) Assignee: Micropply Limited, Cheshire (GB)

( * ) Notice: Subject to any disclaimer, the term of this patent is extended or adjusted under 35 U.S.C. 154(b) by 526 days.

(21) Appl. No.: 16/971,047

(22) PCT Filed: Feb. 25, 2019

(86) PCT No.: PCT/GB2019/050511
§ 371 (c)(1),
(2) Date: Aug. 19, 2020

(87) PCT Pub. No.: WO2019/162698
PCT Pub. Date: Aug. 29, 2019

(65) Prior Publication Data

US 2021/0086526 A1 Mar. 25, 2021

(30) Foreign Application Priority Data

Feb. 26, 2018 (GB) ..................................... 1803093

(51) Int. Cl.
*B41J 3/28* (2006.01)
*B41J 3/36* (2006.01)
(Continued)

(52) U.S. Cl.
CPC . *B41J 3/28* (2013.01); *B41J 3/36* (2013.01); *B41J 3/4073* (2013.01); *B41J 3/54* (2013.01);
(Continued)

(58) Field of Classification Search
CPC ....... B41J 3/28; B41J 3/286; B41J 3/36; B41J 3/4073; B41J 3/54; B41J 19/205;
(Continued)

(56) References Cited

U.S. PATENT DOCUMENTS 2,874,677 A * 2/1959 Braun ................. B05B 12/1418 118/305
3,219,276 A * 11/1965 Norris ................. B05B 13/0478 239/420
(Continued)

FOREIGN PATENT DOCUMENTS

CA 3012904 6/2022
CN 2460300 Y 11/2001
(Continued)

OTHER PUBLICATIONS

Chinese Office Action (not translated,, Chinese Application No. 201980015089.X, dated Feb. 8, 2022, 9 pages.
(Continued)

*Primary Examiner* — Jill E Culler
(74) *Attorney, Agent, or Firm* — Hartman Global IP Law; Gary M. Hartman; Domenica N. S. Hartman

(57) ABSTRACT

A printer has first and second print sections 100, 200 joined along a line 12, and a controller 50. Each section contains a printhead 120; 220 travelling on a track 110; 210. A frame or frame part 104 supports the track and is driven on wheels by a motor, so that the printer can travel autonomously along a horizontally extending step edge, printing as it goes. It further includes a sensor for detecting the proximity of the vertical face 5v of the step. The printer can thus be set to print advertising, for instance, on the steps of a stadium.

15 Claims, 4 Drawing Sheets

(51) Int. Cl.

| | |
|---|---|
| ***B41J 3/407*** | (2006.01) |
| ***B41J 3/54*** | (2006.01) |
| ***B41J 19/20*** | (2006.01) |
| ***B41J 25/00*** | (2006.01) |
| ***B41J 25/308*** | (2006.01) |
| ***B41J 29/02*** | (2006.01) |
| ***B41J 29/38*** | (2006.01) |

(52) U.S. Cl.
CPC ........... *B41J 19/205* (2013.01); *B41J 25/001* (2013.01); *B41J 25/308* (2013.01); *B41J 29/02* (2013.01); *B41J 29/38* (2013.01); *B41J 3/286* (2013.01)

(58) Field of Classification Search
CPC ........ B41J 25/001; B41J 25/308; B41J 29/02; B41J 29/38
See application file for complete search history.

(56) References Cited

U.S. PATENT DOCUMENTS

| | | | | |
|---|---|---|---|---|
| 4,937,678 | A * | 6/1990 | Murai | B41J 2/01 347/3 |
| 4,944,243 | A * | 7/1990 | Takeno | B05B 13/005 118/305 |
| 5,935,657 | A | 8/1999 | Melendez | |
| 6,092,939 | A | 7/2000 | Nishikori et al. | |
| 6,174,036 | B1 | 1/2001 | Aman et al. | |
| 6,832,864 | B2 * | 12/2004 | Patton | B41J 3/4073 400/323.1 |
| 8,922,548 | B2 * | 12/2014 | Randall | G06T 11/001 345/582 |
| 2004/0247358 | A1 | 12/2004 | Cannell et al. | |
| 2008/0252671 | A1 | 10/2008 | Cannell et al. | |
| 2015/0186757 | A1 | 7/2015 | Priyadarshi | |
| 2019/0039386 | A1 * | 2/2019 | Schmidt | B41J 3/4073 |

FOREIGN PATENT DOCUMENTS

| | | |
|---|---|---|
| CN | 10146241 A | 6/2009 |
| JP | 4163066 | 6/1992 |
| WO | 0048841 | 8/2000 |
| WO | 0149360 | 7/2001 |
| WO | 2016004578 | 1/2016 |
| WO | 2017134193 | 8/2017 |

OTHER PUBLICATIONS

Translated Japanese Office Action for Japanese Patent Application No. 2020-567645, dated Nov. 2, 2022, 3 pgs.
Combined Search and Examination Report for Application No. GB1803093.2, dated Aug. 28, 2018 (5 pages).
International Search Report and Written Opinion for PCT/GB2019/050511, dated Jul. 29, 2019 (20 pages).
Translated Japanese Final Office Action dated Jun. 20, 2023 for Japanese Patent Application 2020-567645, 1 page.
Translated Korean Office Action dated Sep. 21, 2023 for Korean Patent Application No. 10-2020-7027070, (10 pages).

* cited by examiner

PRINTING ON FREE SURFACES

CROSS REFERENCE TO RELATED APPLICATIONS

This application claims the benefit of PCT/GB2019/050511 filed Feb. 25, 2019, having a priority claim to British Patent Application No. GB 18 03093.2 filed Feb. 26, 2018. The contents of these prior patent documents are incorporated herein by reference.

The present invention relates to devices and methods for printing on two surfaces or planes at an angle to each other, and specifically on both the tread and the riser of a step. More generally printers are contemplated that can print "at large", without a medium being fed into them, by following a real-world feature such as a step edge.

Most printers or printheads are mounted in frames, and a medium such as paper is fed through the frame to be printed. It is known to print on both faces of a transparent sheet such as a window or windscreen.

The present invention aims to offer a "free-ranging" printer that is not so constrained. One application of such a printer is to print on steps, particularly steps of a public building such as a stadium, for advertising purposes. Currently banners and strips are applied to such surfaces, but this takes some skill, as even a small misalignment is noticeable, and also with wear the strips can detach and become unsightly or even present a hazard.

According to the invention in one aspect there is provided a printer, comprising first and second print sections joined along a line, which can be a hinge, and a controller, at least one of the sections containing a printhead;

a track for the printhead; and a frame or frame part supporting the track;

wherein the printer further includes a motor, and the frame is configured to be applied to a horizontally extending step edge, and further includes a sensor for detecting the proximity of the vertical face of the step, the controller being configured to operate the motor so as to drive the printer along the edge of the step.

The printhead in use will be applied to the vertical or the horizontal face of the step, depending on the configuration of the printer; in many, probably most, embodiments there will be two printheads, one for the riser (vertical face) and one for the tread (horizontal face). In this way both faces can be printed at the same time. In this context "horizontal" and "vertical" designations are approximate, though generally the printer will rest on a surface that is actually horizontal and therefore not need any means of application to this surface, being held down by its own weight. More generally, the printer is constructed on two planes and travels along the intersections of these two planes.

The printhead can be an inkjet printhead, for instance, and can have its own supply or, for more extended use, connections to ink reservoirs nearby. The ink can be more or less permanent and/or weather-resistant, depending on the application. The printer can be powered by a rechargeable battery, for autonomous operation, or can have a mains connection.

The track can be formed from two parallel rails and will usually be perpendicular to the hinge, i.e. to the join line. It can incorporate encoders, such as optical or magnetic encoders, so that the position of the printhead along the rails can be determined and fed back to the controller. This obviates the need for tracking devices such as belts; however, separate encoders could be used.

The frame can have a shape that as it were wraps around the step edge; this can be simply achieved by making it out of two intersecting plates, one horizontal in use and one vertical. The controller and sensor can be mounted on these, the sensor on the vertical plate. The motor can drive the printer's movement by way of wheels under the horizontal plate or frame section, the plate being further supported by ball casters or similar omnidirectional supports. The wheels are preferably independently driven.

The frame can further include end plates which in use hold the far ends of the rails. Preferably these end plates are extensible, so that the printer can be collapsed to a smaller volume when not in use.

The printer will also generally have a housing or shell to protect the parts. This can be of a clamshell design to fold up completely for storage.

In a second aspect there is provided a method of printing, in which a printer is driven along a step edge and prints on one or more of the step faces, while being controlled to follow the step edge.

In a third aspect there is provided a printer comprising a printhead, a track for the printhead and motive means, the printer further including a controller adapted to drive the motive means to cause the printer to travel along the step edge.

For a better understanding of the invention, embodiments will now be described with reference to the attached drawings, in which.

Figure 1:
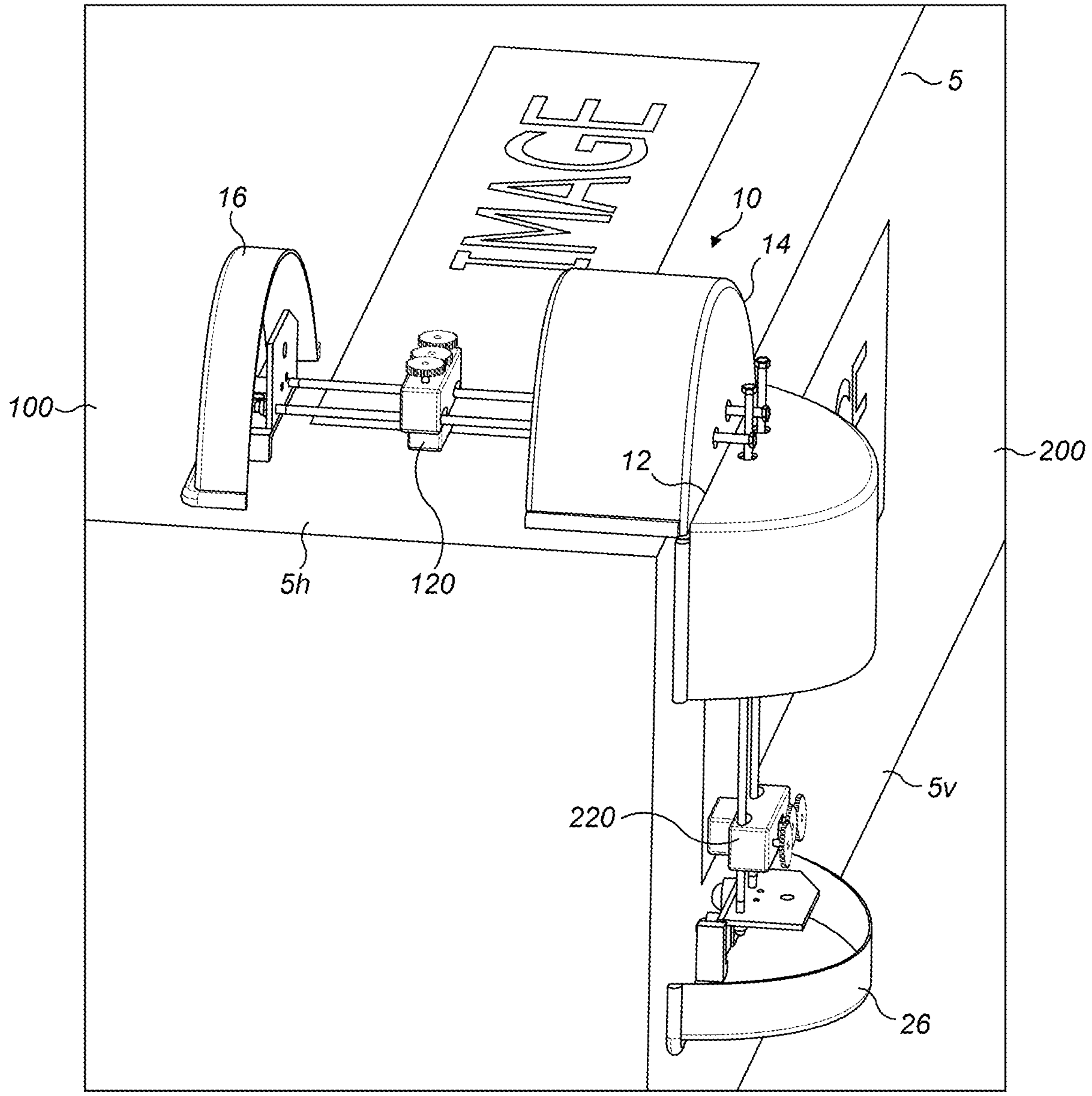
FIG. 1 is a view of a step printer representing an embodiment of the invention.

FIG. 1 shows a step-printing device in accordance with the present invention, resting on a step or ledge 5. The step has a tread or horizontal surface 5*h* and a riser 5*v*, being a more or less vertical plane. For ease of reference, the height of the step will be denoted the z-direction, its depth the y-direction and its side-to-side extent the x-direction.

The printer 1 essentially consists of a frame 104 (FIG. 2), one or more printheads 120, 220, and a shell or casing 10. The printer 1 is in two parts or sections, a horizontal part 100 and a vertical part 200, connected at a hinge 12. Each part has a half-clamshell itself made of two separable parts, a common central part 14 and end parts 16, 26. A flexible cover, not shown, can connect the end parts to the central shell part.

Figure 2:
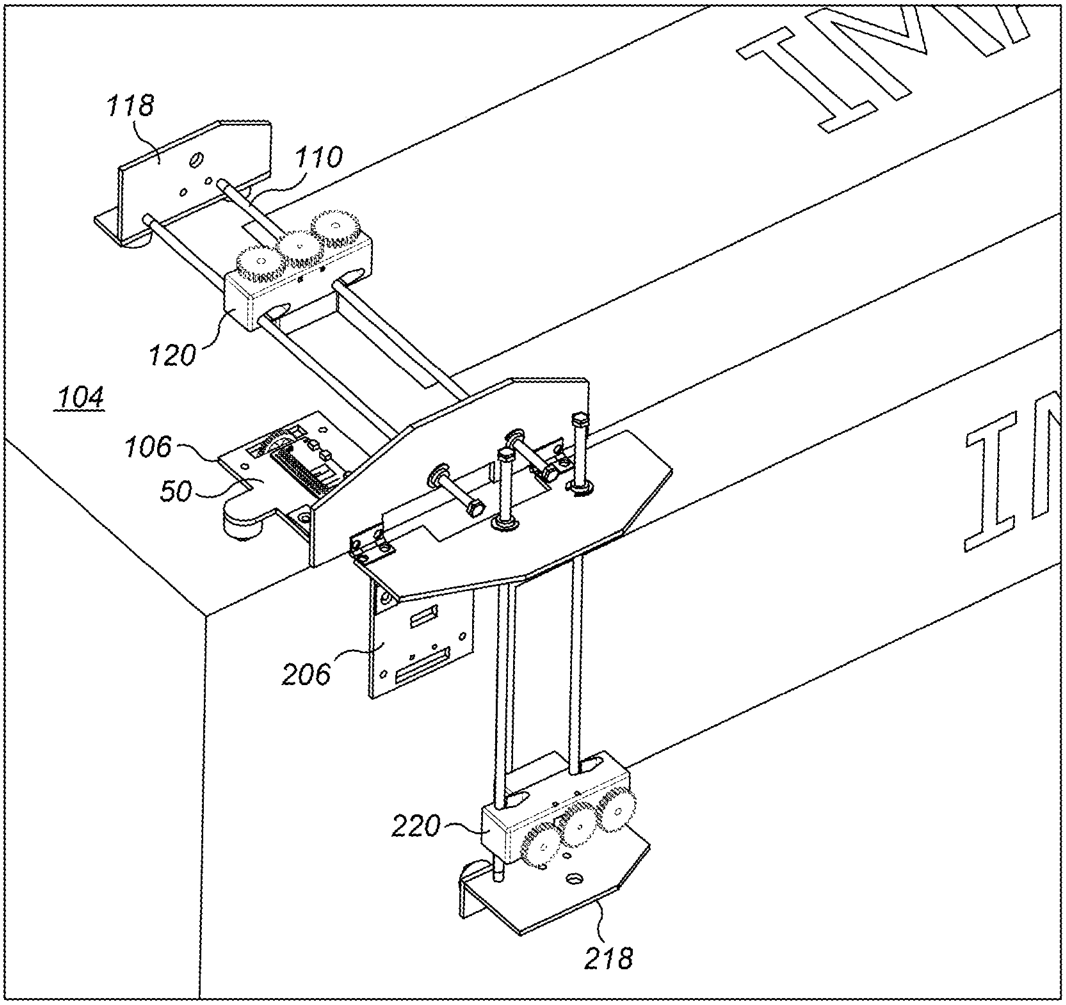
FIG. 2 is a similar view with the casing removed.

The configuration of the printer can be seen in more detail in FIG. 2, which is a view analogous to that of FIG. 1 but with the casing removed so that the frame 104 can be seen more clearly. The frame 104 includes two interlocking base plates, a horizontal plate 106 and a vertical or wall plate, also, as will be explained below, called a sensor plate, 206. The base plates 106, 206 cross so as to form a bracket resting on the edge 5*e* of the step 5.

Located inwardly of the interlocking base plates is an end plate 118, resting on the tread of the step. This end plate is connected to the protruding upper part of the sensor plate 206 by two linear sliders or rails 110 forming a track for the printhead described below. These rails are fixed to the end plate but pass through holes in the sensor plate, forming bearings so that the extension of the end plate can be varied, for instance to fit the size of the step or to determine the extent of printing. The rails also protrude through the central part 14 of the shell, as visible in FIG. 1.

In a similar manner, a lower end plate 218 is connected by vertical rails 218 to the horizontal base plate 106. These rails are similarly adjustable in their downward extent and protrude through the shell 10, slightly offset in the x-direction from the horizontal walls to avoid interference.

Respective autonomous printheads 120, 220 are located on the rails 110, 210. These printheads include respective motors enabling them to move back and forth along the rails during printing; for economy each printhead has a single motor driving two wheels in contact with the two rails, each wheel pressing the rail against a bushing. The printheads are moved with the frame as it travels, as will now be described.

Figure 3:
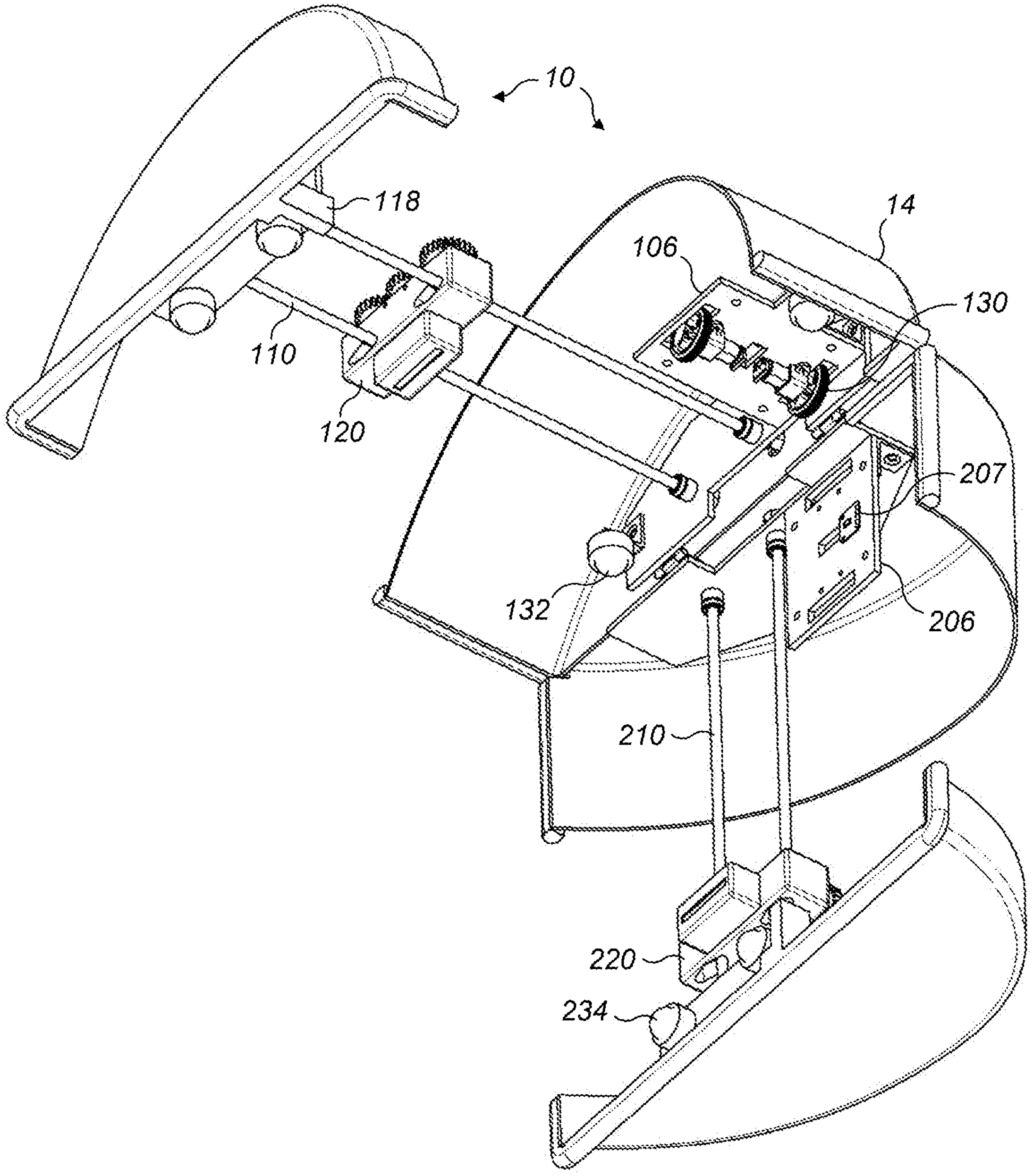
FIG. 3 is a view from the underside of the printer.

FIG. 3 shows the printer from underneath or inwardly of the printhead, revealing also the way that the frame 104 rests on the step. The horizontal part 100 includes a pair of wheels 130 mounted on the base plate 106 on a common axis perpendicular to the hinge line. These wheels are independently driven to form a differential drive so that the device can rotate on the spot in either direction, in order to follow any curvature or irregularity in the step.

The remaining resting points are provided by ball bearings or casters: a bearing 132 spaced along the frame in the x direction, and two balls 134 on the end frame part 118. Meanwhile the vertical frame part 200 has similar ball bearings 234, resting in operation against the riser of the step. The height of the various wheels and bearings is preferably such that the printhead can travel up to the edge of the step, or at least nearly so.

The printer 1 further includes a controller 50, visible on the base plate 106 in FIG. 1. This controller 50 could be a dedicated microcontroller, but in the present embodiment is a Raspberry Pi®. It is connected, e.g. by wires or, as here, wirelessly, to the motor and the print actuators in the printheads, and to a sensor 207, or a set of sensors, mounted on the sensor plate 206. These sensors measure the spacing to the riser of the step, so that the printer 1 can be kept close up to the riser and thus be prevented from falling off the step. The printheads 120, 220 also include further sensors, tracking the position along the rails 110, 220. This can be done by encoders built into the rails themselves, as schematically shown, or with separate encoders.

Figure 4:
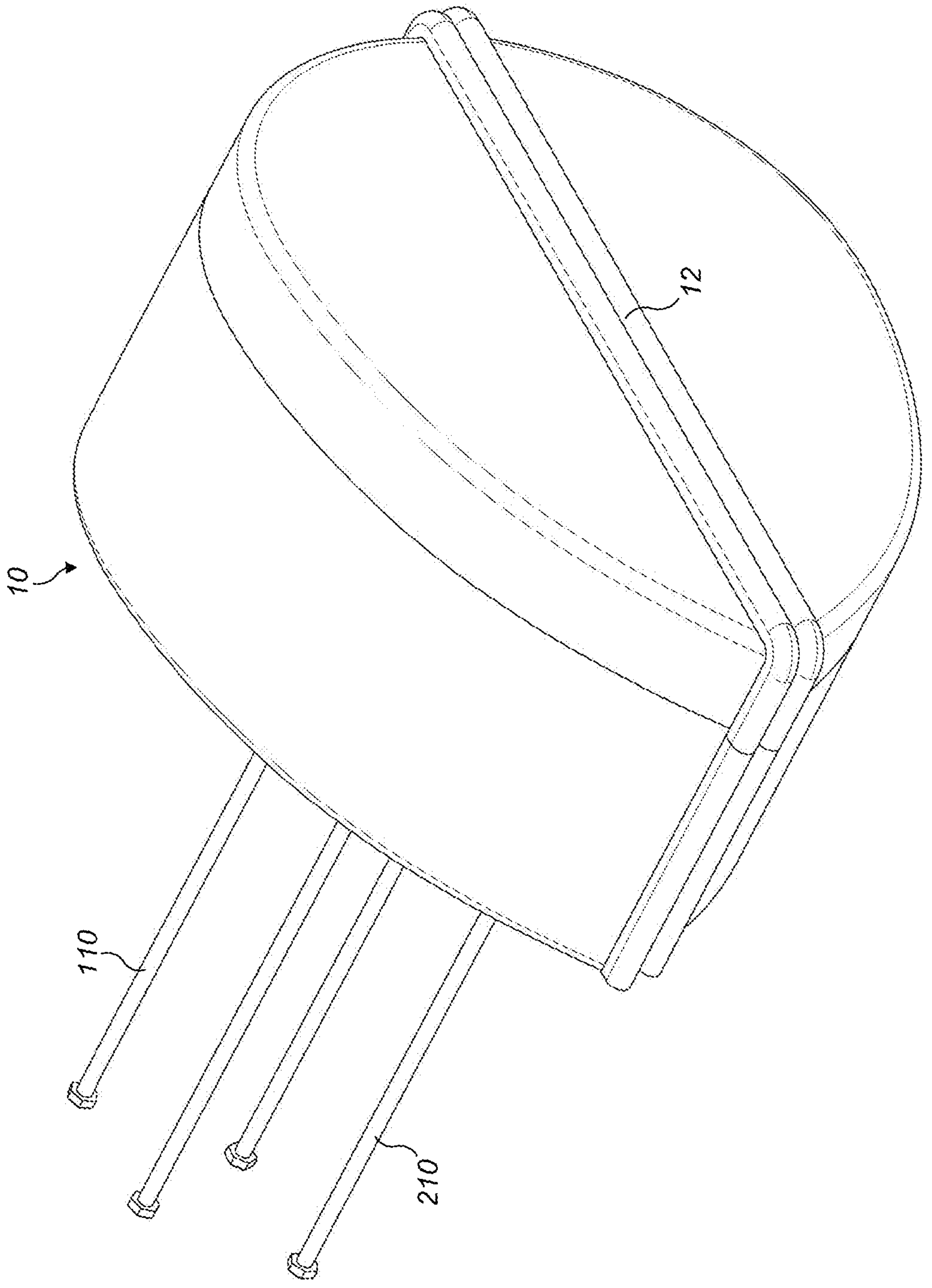
FIG. 4 is a view with the casing closed.

In the present embodiment, the printer when not in use can be folded for storage. To this end, the print heads and the end plates travel right up to the respective base plates, so that the rails 110, 210 protrude through the central shell parts 14 to the maximum extent. The shell parts can then be folded along the hinge line, leaving the device in the folded configuration shown in FIG. 4. A separate cover can be applied to the protruding rails if appropriate.

Operation of the printer will now be described. First the printer is unfolded and the end parts 16, 26 of the shell extended to match the depth and height of the step respectively, if the whole area is to be printed. Since the region around the step is free, the protruding rails are not obstructed. Then the printer is placed at one end of the print area and set to print.

Each printhead 120, 220 then travels the length of its rail, or as long as it is required to print, under the control of the controller 50, on which also the graphics are stored. The processor then advances the printer by rotating the wheels 130. Generally the printer travels only in one direction, e.g. to the left in FIG. 2, to ensure that it does not travel over the printed surface. A useful feature is to have contact bumpers and ultrasonic sensors to make sure that the printer does not collide with unexpected objects on the step, or to stop it when it does so.

If the sensors on the sensor plate 206 determine that the printer is leaving a set distance range from the vertical face of the step, the processor turns the wheels to restore tracking of the step edge. In this way the printer can follow the step even if it is curved or irregular without being too close or far from the vertical face for printing. A suitable distance range might be of the order of 5-10 mm, for instance. Alternative sensors could be envisaged, such as spring-loaded contact sensors, if this would not interfere with the printing.

Because the rails are of necessity offset in the x-direction, the horizontal or vertical printhead may have to complete a final run to square off the print, and indeed the other printhead will have started printing first.

A number of modifications of the example shown can be contemplated within the scope of the invention. For instance, the riser of the step need not be vertical, and the "vertical" section 200 can be angled accordingly, either permanently or by having a fixable degree of rotation about the hinge.

The base plate or central frame section 106, 206 can be an integral construction, instead of being two interlocking parts.

The embodiment described has two rails, as is preferred, but there can be just one or (preferably) more than two rails on which the printheads run. The rails themselves do not also have to be encoders, as in the example, but could be separate parts, and also a different sensing method can be used than the optical system shown, e.g. magnetic. The two halves of the printer do not have to be the same but can have different rails, plates, bearings and so forth if circumstances dictate.

It is not even necessary to have both horizontal and vertical printheads, as long as the step- or edge-following method is used. For instance, if it were desired to printer the border of a shallow step, a suitable printer would have only a horizontal printer with an edge-follower tracking the step edge.

The printer can be used to print on any kind of step, such as platform edges, ledges, or the walls of buildings.

The invention claimed is:

1. A printer configured to simultaneously print on vertical and horizontal faces of a step, the printer comprising first and second sections joined along a line, and a controller, the first section containing a first printhead;

a first track on which the first printhead is guided, the first track defining a variable length along which the first printhead is able to travel; and a first frame supporting the first track, the first frame comprising a base plate and an end plate, the base plate and the end plate being coupled to the first track so that the end plate is extendable relative to the base plate so as to determine the variable length along which the first printhead is able to travel; and the second section containing a second printhead, a second track on which the second printhead is guided, and a second frame supporting the second track;

wherein the printer further includes a motor, and the first frame is configured to be capable of being applied to a horizontally extending edge of the step, and further includes a sensor for detecting proximity of the vertical face of the step, the controller being configured to operate the motor so as to be capable of driving the printer along the edge of the step.

2. A printer according to claim 1, wherein:

the first section comprises a first casing;

the second section comprises a second casing; and a hinge defines the line along which the first and second sections are joined and pivotable and about which the printer can be folded, so as to adapt the printer to different angles of the step, the first and second sections being pivotable to enclose the first and second printheads within the first and second casings for storage.

3. A printer according to claim 1, in which the first printhead is configured to be applied to the horizontal face of the step.

4. A printer according to claim 1, in which the second printhead is configured to be applied to the vertical face of the step.

5. A printer according to claim 1, in which the first frame includes wheels driven by the motor to drive the printer as it rests on the step, the wheels being independently driven enabling the printer to rotate thereon and follow curvature of the edge of the step.

6. A printer according to claim 1, in which the first frame includes at least one ball or caster on which the first frame rests.

7. A printer according to claim 1, in which the first track includes two parallel rails on which the first printhead is guided.

8. A printer according to claim 7, in which the rails also function as encoders for controlling the positioning of the first printhead.

9. A printer according to claim 1, in which the first frame includes a vertical plate for facing a riser of the step, and the sensor is mounted on the vertical plate for maintaining a predetermined distance range of the second printhead from the riser.

10. A method comprising printing on at least one of the vertical face and the horizontal face of the step using the printer of claim 1.

11. A method of printing, in which a printer is driven along a horizontally extending step edge of a step and first and second printheads of the printer simultaneously print on horizontal and vertical faces of the step while being controlled to follow the step edge, wherein:

the first printhead is guided on a first track that defines a variable length along which the first printhead travels, the first track is supported by a base plate and an end plate, and the base plate and the end plate are coupled to the first track so that the end plate is extendable relative to the base plate so as to determine the variable length along which the first printhead travels.

12. A method according to claim 11, in which a feedback mechanism is used to keep the printer at a given distance or range of distances from the step edge.

13. A method according to claim 11, in which the printer is used to print on other steps of a flight of steps containing the step.

14. A method according to claim 11, wherein a hinge defines a line along which first and second sections of the printer are joined so that the printer is pivotable about the line to adapt the printer to different angles of the step and so that the first and second sections are foldable to enclose the first and second printheads within first and second casings of the first and second sections for storage.

15. A method according to claim 11, wherein the first frame includes wheels driven by a motor to drive the printer as it rests on the step, the wheels being independently driven enabling the printer to rotate thereon and follow curvature of the step edge.

* * * * *